(12) United States Patent
Casimiro et al.

(10) Patent No.: US 10,647,893 B2
(45) Date of Patent: May 12, 2020

(54) AQUEOUS-BASED POLYCHLOROPRENE CONTACT ADHESIVE

(71) Applicant: Bostik SA, La Plaine Saint-Denis (FR)

(72) Inventors: Jessie Casimiro, Brie Comte Robert (FR); Mélanie Nataf, Romainville (FR)

(73) Assignee: BOSTIK SA, La Plaine Saint-Denis (FR)

( * ) Notice: Subject to any disclaimer, the term of this patent is extended or adjusted under 35 U.S.C. 154(b) by 21 days.

(21) Appl. No.: 15/551,128

(22) PCT Filed: Feb. 8, 2016

(86) PCT No.: PCT/FR2016/050264
§ 371 (c)(1),
(2) Date: Aug. 15, 2017

(87) PCT Pub. No.: WO2016/132039
PCT Pub. Date: Aug. 25, 2016

(65) Prior Publication Data
US 2018/0057718 A1    Mar. 1, 2018

(30) Foreign Application Priority Data

Feb. 17, 2015   (FR) ..................... 15 51292

(51) Int. Cl.
| B32B 7/12 | (2006.01) |
| C09J 11/04 | (2006.01) |
| C09J 11/06 | (2006.01) |
| C09J 111/00 | (2006.01) |

(52) U.S. Cl.
CPC .............. *C09J 111/00* (2013.01); *B32B 7/12* (2013.01); *C09J 11/04* (2013.01); *C09J 11/06* (2013.01); *B32B 2255/26* (2013.01)

(58) Field of Classification Search
CPC ........... C09J 111/00; C09J 11/04; C09J 11/06; B32B 7/12; B32B 2255/26
See application file for complete search history.

(56) References Cited

U.S. PATENT DOCUMENTS

| 4,284,703 A * | 8/1981 | Inoue ..................... G03F 1/68 |
| | | 430/142 |
| 2005/0143498 A1* | 6/2005 | Musch ..................... C08C 1/02 |
| | | 524/47 |
| 2011/0237696 A1* | 9/2011 | Achten .................... C08L 11/02 |
| | | 521/150 |

FOREIGN PATENT DOCUMENTS

| DE | 199 24 749 | 12/2000 |
| EP | 0 083 218 | 7/1983 |
| EP | 0 577 526 | 1/1994 |
| EP | 1 778 797 | 5/2007 |
| EP | 2 108 007 | 10/2009 |
| EP | 2 114 378 | 11/2009 |
| EP | 2 303 982 | 4/2011 |
| FR | 2 950 061 | 3/2011 |
| FR | 2 956 862 | 9/2011 |
| FR | 2 973 383 | 10/2012 |
| FR | 2 982 263 | 5/2013 |
| WO | WO-01/10968 | 2/2001 |
| WO | WO-2006/016035 | 2/2006 |
| WO | WO-2008/067365 | 6/2008 |
| WO | WO-2008/084298 | 7/2008 |
| WO | WO-2008/096237 | 8/2008 |
| WO | WO-2010/001206 | 1/2010 |

OTHER PUBLICATIONS

International Search Report dated May 2, 2016 for PCT/FR2016/050264.

* cited by examiner

*Primary Examiner* — Melissa A Rioja
(74) *Attorney, Agent, or Firm* — NK Patent Law

(57) ABSTRACT

Aqueous-based adhesive composition comprising a mixture of polycholorprenes, at least one self-crosslinkable agent of alkyd type and at least one filler, 2) use of such a composition as contact adhesive, 3) multilayer structure assembled with the aid of the adhesive composition 1).

15 Claims, No Drawings

AQUEOUS-BASED POLYCHLOROPRENE CONTACT ADHESIVE

CROSS-REFERENCE TO RELATED APPLICATIONS

This application is a U.S. National Stage application of International Application No. PCT/FR2016/050264, filed Feb. 8, 2016, which claims the benefit of French Application No. 1551292, filed Feb. 17, 2015.

The present invention relates to an aqueous-based adhesive composition comprising a mixture of polychloroprenes, at least one self-crosslinkable agent of alkyd type and at least one filler, the use of such a composition as contact adhesive in order to assemble two materials, and also a multilayer structure assembled by means of an adhesive composition according to the invention.

Contact adhesive is customarily used to denote an adhesive composition capable of assembling, by adhesive bonding, two materials following a particular implementation process.

Unlike a fixing adhesive, a contact adhesive is applied by double adhesive coating, that is to say that the composition is applied to each of the surfaces of the two materials to be assembled, then left to dry for a certain length of time (termed the drying time) necessary for the formation of adhesive films which are dry to the touch, before assembly of the materials by pressing said adhesive films against one another. This drying time must also be less than the open time of the adhesive, that is to say than the time after which the adhesive loses its adhesive bonding properties and can no longer bond the materials to be assembled.

A distinction is generally made between two types of contact adhesive: solvent-based contact adhesives, the medium of which essentially consists of volatile organic solvent(s), and aqueous-based contact adhesives, the medium of which essentially consists of water.

Solvent-based contact adhesives are currently used in various sectors of activity, such as the industry or field of building, due to their numerous advantages.

These adhesives are for example used for the adhesive bonding of shoes and plywood (furniture), for the adhesive bonding of stair nosing made of polyvinyl chloride (PVC) or textile, skirtings, plastic paving stones on concrete, leveling coatings, plaster or plasterboard, decorative laminates on wood or particle boards, insulating plastic foams on asbestos cement, concrete, metals, or else for the adhesive bonding of rubber coatings.

The majority of solvent-based contact adhesives are formulated based on polychloroprene (neoprene). They have numerous advantages:
- a short drying time, promoted by the rapid evaporation of the volatile organic solvents, leading to a significant gain in time in the application of the adhesive by reducing the waiting time between depositing the adhesive and bringing the parts to be assembled into contact,
- immediate setting of the adhesive after drying, reflected by a large and rapid increase in the cohesion of the adhesive, thereby making it possible to bond the two materials simply by pressing,
- adhesion to highly varied materials (steel, resurfacing products, etc.),
- a long working time, corresponding to the maximum period of time to comply with between the end of the drying time and bringing the parts to be adhesively bonded into contact, in order to guarantee adhesive bonding with optimum adhesive performance properties.

A long working time is particularly advantageous, for example for manual applications or adhesive bonding of large parts or complicated parts for which the coating step is often long. Indeed, in such cases, the operator needs to have sufficient time to coat, then bring the coated parts into contact. When the adhesive has an insufficient working time, bringing the coated parts into contact does not make it possible to form an adhesively bonded assembly having good mechanical strength.

A long working time also makes it possible for the operator to coat several parts in series before assembling them. It also makes it possible for the operator to adhesively coat the materials to be joined at different moments in time, for example adhesively coat one material the day before, then the other the day after, without the risk of losing the adhesive bonding properties.

The gain in time and the flexibility in terms of use of these adhesives represent not inconsiderable competitive advantages in numerous fields of application.

Nonetheless, one of the major drawbacks of these contact adhesives is their high content of volatile organic solvent, which may extend up to 60% by weight of the weight of the adhesive. This is problematic, given the inflammability of these solvents and the recurring exposure of operators to these products.

Moreover, these compositions may pose problems on some types of support, such as polystyrene (PS) foams, or PVC. Indeed, due to the presence of said solvent, problems of degradation of the PS or yellowing of the PVC may be observed.

In order to overcome these problems, aqueous-based adhesive compositions have been developed.

However, aqueous-based contact adhesives do not make it possible to obtain comparable performance properties to solvent-based contact adhesives, especially in terms of speed of drying and increase in cohesion.

In particular, the difference in performance between these two types of adhesive may be heightened according to the conditions of use of the adhesive. For example, the drying time of the aqueous adhesive is prolonged:
- when the adhesive is dried at low temperature (for example from 10 to 25° C.) or in a humid environment (for example at a relative humidity of greater than or equal to 50%), and/or
- when the volume of adhesive applied is large. This is because the drying of the adhesive is prolonged with increasing thickness of the layer of adhesive applied, making the evaporation of water more difficult.

In numerous applications, especially in the wood or building industries, for which effective adhesive bonding is sought (adhesive bonding which resists mechanical stresses), the adhesive is often applied at an amount of at least 150 grams per meter squared ($g/m^2$) and more preferentially at least 200 $g/m^2$, to each of the surfaces of the materials, leading to the deposition of a thick layer of adhesive on each surface of the materials.

Moreover, the coated surfaces are then generally dried in the open air until adhesive films have formed which are dry to the touch, before being assembled by pressing.

Thus, in these conditions, the drying time of the adhesive is particularly long and has the drawback of depending on the vagaries of the weather in the surrounding area.

In such cases, the delayed drying and the small rise in cohesion of the aqueous adhesive compared to the solvent-based adhesive are particularly bothersome and very frequently lead to the user preferring to use a solvent-based contact adhesive.

In order to bridge the gaps in performance properties observed between solvent-based contact adhesives and aqueous contact adhesives in terms of speed of drying and increase in cohesion, two-component compositions have been developed comprising, separately, on the one hand an aqueous adhesive composition based on polychloroprene having a high solids content, and on the other hand what is referred to as an "external" coagulant based on (citric, lactic or acetic) acid or salts ($ZnSO_4$). The two components of the two-component composition are stored separately and mixed at the last moment before use, in order to cause a rapid setting of the adhesive composition.

Nonetheless, the use of a two-component composition is undesirable since the production of such a composition is complex and costly. Indeed, the use of such a composition requires employing a sophisticated packaging in which the reactive components must not come into contact before use and must be able to be rapidly mixed at the moment of use. In practice, numerous devices are pressurized in order to obtain rapid mixing and/or application of the composition. However, these devices are inadequate when it is desired to store and use large volumes of adhesives.

Moreover, these products have a short working time.

The use of a two-component composition furthermore requires regular maintenance and makes it necessary to pay close attention to the mixing ratio used between the two components. Without this, there is a risk of the mixture not having the desired properties and performance.

Thus, an aqueous-based contact adhesive is sought, having comparable performance to a solvent-based contact adhesive and which is sufficiently stable to be able to be stored in the form of a single-component composition.

Moreover, an aqueous-based contact adhesive is sought, which is capable of giving a strong adhesive joint at high temperatures. Indeed, in numerous applications, the adhesively bonded assembly obtained may be made to subsequently undergo one or more transformation processes which are liable to induce, for example by friction, localized heating at the adhesive bonding zone, such as during a step of sawing or piercing the adhesively bonded assembly.

In patent application WO 01/10968, a single-component adhesive composition is disclosed which comprises a polychloroprene, a resin chosen from copolymers of ethylene and vinyl acetate, homo- and copolymers of polyvinyl acetate, copolymers of acrylic acid and copolymers of acrylic acid and polyvinyl acetate, and what is referred to as an "internal" coagulant, which is a hygroscopic salt optionally mixed with an amino acid. This internal coagulant is capable of inducing drying and rapid setting of the adhesive composition during the use thereof, without however causing destabilization of the adhesive composition. Example 15 of this application moreover teaches the importance of using a resin as described above, which is not self-crosslinkable in order to avoid problems of stability of the adhesive composition.

Nonetheless, the abovementioned single-component adhesive compositions of the prior art still remain to be improved in a certain number of aspects, especially in terms of the speed of drying, the storage stability, the increase in cohesion, the (initial or final) hold of the adhesively bonded assembly, and/or the heat resistance of the adhesive joint.

Surprisingly, it has been discovered that by combining, in certain proportions, particular polychloroprenes with a self-crosslinkable resin of alkyd type and fillers, in the presence of water and a stabilizing system, it was possible to obtain an aqueous-based contact adhesive having one or more of the abovementioned improvements relative to the adhesive composition of the prior art.

The adhesive composition according to the invention has an excellent increase in cohesion, making it possible to rapidly obtain an adhesively bonded assembly having satisfactory mechanical properties. Various tests may be carried out to demonstrate this advantage, such as monitoring the shear strength or the peel strength of the adhesively bonded assembly over time.

The mechanical properties of the adhesively bonded assembly may also be tested by quantitatively evaluating the hold of the assembly shortly after bringing the adhesively coated surfaces into contact. Reference is made to initial hold when the strength of the assembly is evaluated at a time t0 ranging from 2 seconds to less than 2 hours after adhesive bonding of the materials. Reference is made to final hold when the strength of the assembly is evaluated 7 days or more after adhesive bonding of the materials.

The adhesive composition according to the invention is stable, despite a high content of fillers and the presence of a self-crosslinkable resin. In particular, the adhesive composition according to the invention may be easily used and applied, even after having been stored for one or more months, and up to 12 months from its preparation. Indeed, the viscosity of the composition does not change, or virtually does not change, over time.

In particular, it was observed that the adhesive composition according to the invention may be applied to different types of materials, in large amounts (at an amount of 150 to 350 grams of adhesive per meter squared of each of the surfaces of the materials to be assembled, and preferably at an amount of 200 to 300 $g/m^2$ of adhesive on each of the surfaces of the materials to be assembled) while having a low drying time relative to commercially available filler-containing aqueous-based contact adhesives.

More particularly, it was observed that the adhesive composition according to the invention, applied to laminated wood with a grammage of greater than or equal to 150 $g/m^2$, and preferably greater than or equal to 200 $g/m^2$, on both the surfaces to be adhesively coated, and exposed to a drying temperature of 20° C. and a relative humidity of at least 50%, had a drying time of less than or equal to 45 minutes.

In particular, it was observed that the adhesive composition according to the invention makes it possible to adhesively bond various types of materials, even including non-absorbent, barely porous or non-porous supports which are usually difficult to adhesively bond, such as aluminum, PVC or polymethyl methacrylate (PMMA), with a high initial hold.

In addition, it was observed that the adhesive composition according to the invention made it possible to obtain adhesive bonding performance properties (increase in cohesion, hold) that are comparable or even better compared to certain aqueous-based contact adhesives on the market, on various rigid materials, such as wood and the forms derived therefrom (laminates, agglomerates, plywood) or rigid PVC. The same observation was made on various non-rigid materials and in particular on flexible PVC.

In particular, it was observed that the adhesive of the invention made it possible to form rigid material assemblies having a mechanical shear strength of greater than or equal to 30 $kg/cm^2$.

It was also observed that the adhesive composition according to the invention made it possible to obtain adhesive bonding resistant to high temperatures, which may extend up to 140° C.

The adhesive composition according to the invention also has the advantage of being able to be stored in the form of a single-component composition, and more particularly to be packaged in large amounts in a single-compartment, non-pressurized device.

Thus, a subject of the present application relates to an adhesive composition comprising:

A) from 5 to 40% by dry weight of a mixture of polychloroprenes dispersed in water, comprising:

A1) at least one polychloroprene having a hardness greater than or equal to 80 Shore A, and A2) at least one polychloroprene having a hardness less than or equal to 60 Shore A, B) from 0.5 to 25% by dry weight of at least one self-crosslinkable agent of alkyd type, C) from 10 to 40% by dry weight of at least one mineral filler, D) from 0.05 to 3% by dry weight of at least one emulsifier, E) water.

Another subject of the present application is the use of such a composition as contact adhesive, especially for adhesively bonding a first material to a second material, such as, for example, the adhesive bonding of a floor covering to a resurfacing product.

The present application also relates to a multilayer structure comprising at least two identical or different layers of material bonded to one another by a layer of adhesive composition according to the invention.

Other subjects and features or advantages of the present invention will emerge more clearly on reading the description and the examples.

In the present application, unless indicated otherwise:

The hardness of the polychloroprenes is measured by means of a type A durometer, by selecting the appropriate scale (AO or D type), on a 6 mm thick sample of polychloroprene preheated to 100° C. then cooled rapidly to −5° C. (quench), said measurement being carried out 100 hours after the end of the cooling to −5° C.

The sample tested may be obtained from polychloroprene in the form of aqueous dispersion, by application of successive layers of said dispersion which are left to dry and harden between each application.

The sample is then heated at 100° C. for approximately one hour in order to ensure that the whole sample has been brought to this temperature.

The sample is then rapidly cooled to −5° C., until the time at which the hardness is measured. The hardness is expressed in Shore A.

Unless indicated otherwise in the present application, reference may be made to standard NF ISO 7619-1 regarding the method for measuring the hardness of the polychloroprenes.

The size of the particles (filler) is determined according to standard NF ISO 13320-1 (1999) by laser diffraction on a Malvern type apparatus.

The viscosity is measured at 23° C. by means of a Brookfield RVT viscometer, with a number 7 needle at a rotation speed of 10 revolutions per minute (rpm). The value measured in expressed in millipascal seconds (mPa·s).

The content of mineralogical phase is determined from X-ray diffraction analysis according to the Rietveld method.

A compound is termed "cyclic" when the structure forms a hydrocarbon-based ring or a heterocycle, or comprises, in its structure, one or more hydrocarbon-based rings or heterocycles which may be aromatic or aliphatic, and preferably comprising from 5 to 6 ring members, such as phenyl;

A compound is termed "acyclic" when the structure does not form a hydrocarbon-based ring or a heterocycle and does not comprise, in its structure, one or more hydrocarbon-based rings or heterocycles.

A) Mixture of Polychloroprenes

Within the meaning of the present application, "polychloroprene" is intended to mean a chloroprene homopolymer, resulting from the polymerization of the chloroprene monomer (2-chloro-1,3-butadiene).

The mixture of polychloroprenes A) preferably comprises:

A1) at least one polychloroprene in aqueous dispersion having a hardness greater than or equal to 85 Shore A, and more preferentially greater than or equal to 90 Shore A.

The mixture of polychloroprenes A) preferably comprises:

A2) at least one polychloroprene in aqueous dispersion having a hardness less than or equal to 55 Shore A, and more preferentially less than or equal to 50 Shore A.

The polychloroprenes A1) and A2) of use according to the invention may be prepared in a conventional manner by those skilled in the art. In particular, these polymers may be obtained directly in the form of aqueous dispersions of polychloroprenes, by emulsion polymerization of chloroprene in an alkaline reaction medium. It is preferred to add the polychloroprenes A1) and A2) into the adhesive composition of the invention in the form of aqueous dispersions of polychloroprenes having a dry matter content ranging from 50 to 60% by weight of the total weight of said aqueous dispersion.

Such dispersions are commercially available.

Among the aqueous dispersions of polychloroprenes of use, preference is given to using:

the product sold under the name Dispercoll C84 by Bayer, which corresponds to an aqueous dispersion of polychloroprene having a hardness greater than or equal to 90 Shore A and the dry matter content of which is equal to approximately 55% by weight of the weight of the commercial product, the product sold under the name Dispercoll C VP LS2325/1 by Bayer, which corresponds to an aqueous dispersion of polychloroprene having a hardness less than or equal to 45 Shore A and the dry matter content of which is equal to approximately 55% by weight of the weight of the commercial product.

The adhesive composition according to the invention preferably comprises from 7 to 35% by dry weight of a mixture of polychloroprene(s) A1) and A2) as defined above, relative to the weight of the adhesive composition.

The total content of polychloroprene(s) A1) present in the adhesive composition according to the invention preferably ranges from 4 to 25% by dry weight, more preferentially from 5 to 20% by dry weight, and better still from 8 to 14% by dry weight of the weight of the adhesive composition.

The total content of polychloroprene(s) A2) present in the adhesive composition according to the invention preferably ranges from 1 to 15% by dry weight, more preferentially from 2 to 15% by dry weight, and better still from 4 to 11% by dry weight of the weight of the adhesive composition.

B) Self-Crosslinkable Agent of Alkyd Type

The adhesive composition according to the invention comprises at least self-crosslinkable agent based on alkyd resins.

Self-crosslinkable is intended to mean that the agent is capable of crosslinking with itself under the conditions of application of the adhesive composition. Such an agent has at least two alkyd resins each comprising at least one functional group, different from one another and capable of reacting together to give rise to the crosslinking of the adhesive composition at the moment of use.

It is especially possible to use a self-crosslinkable agent such as described in patent application FR 2973383.

The self-crosslinkable agent of use according to the invention preferably consists of:

(i) at least one alkyd resin comprising at least one 5-membered cyclocarbonate function (Y) and (ii) at least one alkyd resin comprising at least one primary amine function (X) salified by a volatile weak acid.

The use of a primary amine function (X) in acid salt form makes it possible to protect said function from the cyclocarbonate function with which it is capable of reacting until the moment of use of the adhesive composition.

During the application of the adhesive composition, and the drying thereof (generally in the open air at a temperature ranging from 10 to 25° C.), the volatile weak acid and the water will evaporate and cause a shift in the chemical equilibria, which, by deprotecting the primary amine function, will initiate crosslinking of the self-crosslinkable agent by reaction of the deprotected function with the function (Y).

The reaction of the (X) and (Y) functions makes it possible to form a hydroxyurethane bond between the chains of the alkyd resins and to ultimately create a network of crosslinked chains.

The volatile weak acid preferably has a carbon-based chain comprising from 1 to 6 carbon atoms, such that evaporation is easy at low temperature (10-25° C.).

Weak acid is intended to mean an acid having a pKa ranging from 1 to 14 and more specifically from 3 to 9.

The volatile weak acid is preferably chosen from carbonic acid, formic acid and acetic acid.

Alkyd resin is intended to mean a polyester obtained by polycondensation between at least one polyol and at least one polyacid, and modified by fatty acids or oils and/or non-fatty acids.

The alkyd resin may also be modified by other polymers such as polyurethanes, silicones, vinyl polymers, polyamides or polyacrylics.

The alkyd resins (i) and (ii) are preferably polyesters obtained by polycondensation between at least one polyol and at least one polyacid, and modified by fatty acids or oils and/or non-fatty acids.

Oil is intended to mean a fatty acid oil, namely a fatty substance which is liquid at room temperature and comprises fatty acids. Use may be made, for example, of an oil of plant origin.

Fatty acid is intended to mean an acid comprising a hydrocarbon-based chain comprising from 8 to 32 carbon atoms, preferentially from 14 to 22 carbon atoms.

Non-fatty acid is intended to mean an acid comprising a hydrocarbon-based chain comprising from 1 to 7 carbon atoms, preferentially from 2 to 6 carbon atoms.

Fatty or non-fatty acids are preferably monoacids.

Fatty or non-fatty carboxylic acids are generally used.

The polyols of use for the preparation of the alkyd resins (i) and (ii) comprise at least two hydroxyl functions and are preferably chosen from the following polyols and mixtures thereof: butane-1,3-diol, diethylene glycol, dipentaerythritol, dipropylene glycol, ethylene glycol, glycerol, hexanediol, neopentyl glycol, pentaerythritol, pentanediol, polyethylene glycol, polypropylene glycol (of molecular weight ranging from 300 to 6000), propane-1,3-diol, propylene glycol, sorbitol, triethylene glycol, trimethylolpropane, trimethylolethane and xylose.

The polyacids of use for the preparation of the alkyd resins (i) and (ii) comprise at least two acid functions, in carboxylic acid or anhydride form, and are preferably chosen from the following polyacids and mixtures thereof: citric acid, isophthalic acid, terephthalic acid, phthalic anhydride, in para, meta or ortho position, pyromellitic anhydride, trimellitic anhydride, and adipic, azelaic, diglycolic, fumaric, maleic, oxalic, succinic, sebacic acids or anhydrides.

The fatty or non-fatty acids of use for the preparation of the alkyd resins (i) and (ii) are preferably monoacids which may bear other groups such as hydroxyl and amine groups, preferably chosen from the following monoacids and mixtures thereof: abietic acid, benzoic acid, para-tert-butylbenzoic acid, methylbenzoic acid, butanoic acid, caproic acid, caprylic acid, capric acid, crotonic acid, 2-ethylhexanoic acid, lactic acid, lysine, pentanoic acid and propionic acid.

The fatty acids of use for the preparation of the alkyd resins (i) and (ii) may be conjugated or unconjugated unsaturated fatty acids, preferably chosen from: linoleic acid, linolenic acid, alpha-eleostearic acid, alpha-licanic acid, coconut, cotton seed or linseed fatty acids, linoleic, linolenic, oleic, pinolenic or pelargonic fatty acids, and castor, dehydrated castor, soybean, tall oil and sunflower fatty acids.

The oils of use for the preparation of the alkyd resins (i) and (ii) may be chosen from the following oils of plant origin and mixtures thereof: safflower, coconut, cotton seed, linseed, grapeseed, oiticica, olive, palm, soybean, sunflower, castor, dehydrated castor, soybean, tung and tall (pine resin) oils.

As non-fatty monocarboxylic acids of use for preparing the alkyd resins, mention may also be made of abietic, benzoic, butanoic, caproic, caprylic, capric, crotonic, para-tert-butylbenzoic, pentanoic and propanoic acids and mixtures thereof.

It is preferred to add the self-crosslinkable agent based on alkyd resins into the adhesive composition according to the invention in the form of an aqueous dispersion in which the alkyd resin (i) is preferably immiscible with the alkyd resin (ii).

Advantageously, as self-crosslinkable agent based on alkyd, an aqueous dispersion of alkyd resins (i) and (ii) as defined above, based on oil of plant origin, such as tall oil, is used.

In particular, use may be made of the product sold under the name Secoia Exp 503 by Ecoat, which corresponds to an aqueous dispersion of alkyd resin based on tall oil stabilized by anionic and non-ionic surfactants and comprising from 49 to 51% by weight of dry matter and approximately 25% by weight of organic phase relative to the weight of the aqueous dispersion.

The total content of self-crosslinkable agent(s) based on alkyd resins present in the adhesive composition according to the invention preferably ranges from 1 to 10% by dry weight of the weight of the adhesive composition.

C) Filler

The filler of use according to the invention is preferably chosen from mineral fillers.

The mineral filler of use according to the invention may be chosen from calcium carbonate, silica, a composite based on silica and kaolinite, sepiolite, and the mixture thereof.

The mineral filler of use according to the invention may comprise, in its chemical composition, from 0 to 15% by weight of at least one metal oxide, chosen for example from $Al_2O_3$, $Fe_2O_3$, $TiO_2$, and the mixture thereof.

The filler of use according to the invention preferably has a particle size of greater than or equal to 1 μm.

The adhesive composition preferably comprises, as filler:
from 10% to 35% by weight of silica relative to the total weight of the adhesive composition,
from 0 to 25% by weight of a composite based on silica and kaolinite relative to the total weight of the adhesive composition,
from 0 to 2.5% by weight of sepiolite relative to the total weight of the adhesive composition, the total content of filler(s) present in the adhesive composition ranging from 10 to 40% by weight relative to the weight of the adhesive composition.

According to a first, more preferred variant, the adhesive composition comprises, as filler:
from 15% to 25% by weight of silica relative to the total weight of the adhesive composition,
from 7 to 18% by weight of a composite based on silica and kaolinite relative to the total weight of the adhesive composition,
0% by weight of sepiolite relative to the total weight of the adhesive composition, the total content of filler(s) present in the adhesive composition additionally being less than or equal to 35% by weight relative to the weight of the adhesive composition.

According to a second, more preferred variant, the adhesive composition comprises, as filler:
from 15% to 25% by weight of silica relative to the total weight of the adhesive composition,
from 7 to 18% by weight of a composite based on silica and kaolinite relative to the total weight of the adhesive composition,
from 0.5 to 2% by weight of sepiolite relative to the total weight of the adhesive composition, the total content of filler(s) present in the adhesive composition additionally being less than or equal to 35% by weight relative to the weight of the adhesive composition.

The silica of use according to the invention preferably comprises at least 95% by weight of $SiO_2$, and more preferentially at least 98% by weight of $SiO_2$.

The composite based on silica and kaolinite of use according to the invention is preferably a natural composite of cryptocrystalline silica, of amorphous silica and of kaolinite, also known under the name Neuburg silica.

The composite based on silica and kaolinite of use according to the invention may ideally be represented by the following general formula:

$$SiO_2-Al_2[(OH)_4Si_2O_5]$$

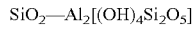

The composite based on silica and kaolinite of use according to the invention may comprise from 55 to 70% by weight of a mineralogical phase of cryptocrystalline silica, from 8 to 10% by weight of a mineralogical phase of amorphous silica, and from 17 to 30% by weight of mineralogical phase of kaolinite relative to the weight of said composite.

Sepiolite is a hydrated magnesium silicate from the family of phyllosilicates with a fibrous structure. It may ideally be represented by the following general formula:

$$Mg_4Si_6O_{15}(OH)_2 \cdot 6H_2O$$

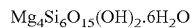

The filler of use according to the invention may or may not be chemically treated, for example by means of a silane. It may be calcined or uncalcined.

The fillers of use according to the invention are commercially available.

The total content of filler(s) present in the adhesive composition according to the invention preferably ranges from 15 to 40% by dry weight of the weight of the adhesive composition, more preferentially from 22 to 35% by dry weight of the weight of the adhesive composition.

D) Emulsifier

The adhesive composition according to the invention comprises at least one emulsifier.

The emulsifier of use according to the invention may be chosen from surfactants, polyvinyl alcohols, and mixtures thereof.

The surfactant of use according to the invention may be anionic, non-ionic, or a mixture of anionic and non-ionic surfactants.

The non-ionic surfactant may be chosen from oxyethylenated, linear or branched, cyclic or acyclic, saturated or unsaturated, preferably unsaturated, fatty alcohols having a hydrophilic-lipophilic balance (HLB) ranging from 10 to 20 and/or a cloud point ranging from 60 to 70° C.

Fatty alcohol is intended to mean an alcohol, preferably a monoalcohol, comprising from 8 to 30 carbon atoms and more preferentially from 10 to 22 carbon atoms.

The anionic surfactant may be chosen from:
sodium mono/dialkylphenoxybenzenedisulfonate salts, the linear or branched alkyl portion of which comprises from 10 to 14 carbon atoms,
oxyethylenated sulfosuccinic acid and fatty alcohol ester salts,
oxyethylenated alkyl ether sulfate salts, the linear or branched alkyl portion of which comprises from 10 to 18 carbon atoms.

A system of at least two, and preferably at least three, emulsifiers chosen from the following emulsifiers is preferably used:
oxyethylenated unsaturated acyclic fatty alcohols having an HLB ranging from 15 to 18, preferably oxyethylenated unsaturated acyclic $C_{16}$-$C_{18}$ alcohols having an HLB ranging from 15 to 18,
oxyethylenated unsaturated cyclic fatty alcohols having a cloud point ranging from 63 to 67° C., preferably oxyethylenated aromatic cyclic fatty alcohols having a cloud point ranging from 63 to 67° C., such as ethoxylated distyrylphenol,
mixtures of mono- and dialkylphenoxybenzenedisulfonate salts, the linear or branched alkyl portion of which comprises from 10 to 14 carbon atoms, such as mixtures of monododecylphenoxybenzenedisulfonate and didodecylphenoxybenzenedisulfonate salts,
oxyethylenated sulfosuccinic acid and alcohol hemiester salts comprising from 10 to 14 carbon atoms, such as oxyethylenated sulfosuccinic acid and lauric alcohol hemiester salts,
oxyethylenated alkyl ether sulfate salts, the linear or branched alkyl portion of which comprises from 12 to 14 carbon atoms, such as oxyethylenated lauryl ether sulfate salts,
polyvinyl alcohols.

More preferentially, the abovementioned salts are chosen from the sodium salts.

The emulsifiers of use according to the invention are commercially available.

The total content of emulsifier(s) present in the adhesive composition according to the invention preferably ranges from 0.5 to 2.5% by dry weight of the weight of the adhesive composition.

E) Water

The adhesive composition according to the invention preferably comprises from 20 to 40% by weight of water relative to the total weight of the adhesive composition.

The adhesive composition according to the invention more preferentially comprises from 20 to 35% by weight of water relative to the total weight of the adhesive composition.

The adhesive composition preferably comprises less than 1% by weight of volatile organic solvent. More preferentially, the adhesive composition does not comprise volatile organic solvents, such as those having a boiling point below 250° C. at atmospheric pressure.

F) Metal Oxide

The adhesive composition according to the invention may also comprise at least one metal oxide.

The metal oxide of use according to the invention is preferably a divalent metal oxide such as ZnO, MgO, or CaO. More preferentially, a metal oxide which is insoluble or sparingly soluble in water, such as ZnO, is used.

The addition of metal oxide into the adhesive composition makes it possible to improve its storage stability.

Without being bound by theory, the metal oxide of use according to the invention serves as acid scavenger. It makes it possible to "scavenge" the hydrochloric acid released by the reaction of degradation of the polychloroprene over time, and to thereby prevent this acid from self-maintaining the reaction of degradation of the polychloroprene.

The metal oxide of use according to the invention is in the form of a pulverulent solid.

The total content of metal oxide(s) present in the adhesive composition according to the invention preferably ranges from 0.05 to 0.3% by dry weight, and more preferentially from 0.1 to 0.25% by dry weight of the weight of the adhesive composition.

G) Adhesion Agent

The adhesive composition according to the invention may also comprise at least one adhesion agent chosen from copolymers of styrene and (meth)acrylic acid, copolymers of styrene and (meth)acrylic acid ester, copolymers of styrene and (meth)acrylamide, said copolymers possibly being silanized, homopolymers and copolymers of butadiene such as polybutadiene and polybutadiene-styrene, vinyl acetate polymers, such as the copolymer of (meth)acrylic acid and vinyl acetate, polyurethanes obtained from at least one polyol and at least one polyisocyanate, and mixtures comprising on the one hand at least one polyurethane obtained from at least one polyol and at least one polyisocyanate and on the other hand at least one polyester obtained by polycondensation between at least one polyol and at least one polyacid.

In particular, the monomers of (meth)acrylic acid or of (meth)acrylic acid ester of use for preparing the adhesion agent may be chosen from:

acrylic acid, methacrylic acid, alkyl (meth)acrylate, the linear or branched, cyclic or acyclic alkyl portion of which comprises from 1 to 18 carbon atoms, allyl (meth)acrylate, alkyl ether (or alkoxyalkyl) (meth)acrylate, each of the alkyl portions of which, which may be identical or different, is linear or branched and comprises from 1 to 18 carbon atoms, alkylaryl ether (meth)acrylate (or aryloxyalkyl (meth)acrylate), the linear or branched alkyl portion of which comprises from 1 to 18 carbon atoms, and the aryl portion of which is a phenyl group, hydroxyalkyl (meth)acrylate, the linear or branched alkyl portion of which comprises from 1 to 18 carbon atoms and is optionally interrupted by ester functions —C(=O)—O—, polypropylene glycol or polyethylene glycol (meth)acrylate.

More specifically, the monomers of (meth)acrylic acid or of (meth)acrylic acid ester may be chosen from methyl acrylate, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, stearyl acrylate, stearyl methacrylate, glycidyl methacrylate, hydroxyethyl acrylate, hydroxyethyl methacrylate, allyl methacrylate, cyclohexyl acrylate, cyclohexyl methacrylate, 2-ethoxyethyl acrylate, 2-ethoxyethyl methacrylate, isodecyl acrylate, isodecyl methacrylate, 2-methoxyethyl acrylate, 2-ethoxyethyl methacrylate, 2-(2-ethoxyethoxy)ethyl acrylate, 2-phenoxyethyl acrylate, 2-phenoxyethyl methacrylate, isobornyl acrylate, isobornyl methacrylate, caprolactone acrylate, caprolactone methacrylate, polypropylene glycol acrylate, polypropylene glycol methacrylate, polyethylene glycol acrylate, polyethylene glycol methacrylate, benzyl acrylate and benzyl methacrylate.

The adhesion agent is preferably chosen from copolymers of styrene and acrylic acid and copolymers of styrene and acrylic acid ester, optionally silanized, copolymers of (meth)acrylic acid and vinyl acetate, polyurethanes as defined above, and mixtures of polyurethane(s) and polyester(s) as defined above, and mixtures thereof.

The adhesion agent of use according to the invention is water-dispersible or water-soluble and preferably has a glass transition temperature (Tg) of less than or equal to 65° C., and more preferentially ranging from 5 to 65° C.

Moreover, preference is given to adding the abovementioned adhesion agent(s) into the adhesive composition in the form of aqueous dispersion(s) which may have a dry matter content ranging from 40 to 60% by weight of the total weight of said aqueous dispersion.

Such products are sold, for example, under the name "Acronal® S813" (copolymer of styrene and acrylic acid ester, having a Tg of 28° C., in the form of an aqueous dispersion containing 49 to 51% by weight of solids), or "Acronal® S533" (copolymer of styrene and acrylic acid, having a Tg of 5° C., in the form of an aqueous dispersion containing 51 to 53% by weight of solids) by BASF, or "Plextol R 5530" (copolymer of acrylic acid and vinyl acetate, having a Tg of 33° C., in the form of an aqueous dispersion containing approximately 46% by weight of solids) by Synthomer.

The total content of adhesion agent(s) present in the adhesive composition according to the invention preferably ranges from 1 to 20% by dry weight of the weight of the adhesive composition.

H) Tackifying Resin

The adhesive composition according to the invention may also comprise at least one tackifying resin.

By way of example of tackifying resin(s) of use, mention may be made of any tackifying resin customarily used in the field of adhesive compositions.

A tackifying resin having a weight-average molar mass (Mw) ranging from 200 to 5000 is preferably used, preferably chosen from:
(i) rosins of natural origin or chemically modified rosins, such as, for example, the rosin extracted from pine gum, wood rosin extracted from tree roots and their derivatives which are hydrogenated, dimerized, polymerized or esterified by monoalcohols or polyols, such as glycerol, pentaerythritol or neopentyl glycol, optionally oxyethylenated, such as triethylene glycol;
(ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;
(iii) terpene resins generally resulting from the polymerization of terpene hydrocarbons, such as, for example, monoterpene (or pinene), in the presence of Friedel-Crafts catalysts, which are optionally modified by the action of phenols;
(iv) copolymers based on natural terpenes, for example styrene/terpene, α-methylstyrene/terpene and vinyltoluene/terpene,
and the mixture thereof.

The tackifying resin of use according to the invention is preferably chosen from:
(i) rosin esters, obtained by esterification of rosins by monoalcohols or polyols such as glycerol, pentaerythritol or neopentyl glycol, optionally oxyethylenated, such as triethylene glycol, and
(iii) terpene-phenol resins resulting from the polymerization of terpene hydrocarbons, such as, for example, monoterpene (or pinene), in the presence of Friedel-Crafts catalysts modified by the action of phenols,
and the mixture thereof.

The tackifying resin of use according to the invention may be added into the adhesive composition of the invention in the form of aqueous dispersion having, for example, a dry matter content ranging from 40 to 60% by weight of the total weight of said aqueous dispersion.

The tackifying resins of use according to the invention are commercially available.

Mention may be made, by way of example, of the tackifying resin sold under the name "Granolit 150N" by Granel S.A., which corresponds to a modified rosin esterified with triethylene glycol, or else the aqueous dispersion of tackifying resin sold under the name "Demulsene TR 602" by DRT, which corresponds to an aqueous dispersion of a terpene-phenol resin containing approximately 55% by weight of solids relative to the weight of the commercial product.

The total content of tackifying resin(s) present in the adhesive composition according to the invention preferably ranges from 3 to 20% by dry weight of the weight of the adhesive composition.

I) Thickener

The adhesive composition according to the invention may also comprise at least one thickener.

Any type of organic or mineral thickener customarily used in an adhesive composition may be used.

In particular, organic thickeners may be associative or non-associative thickening polymers, different from the polymers mentioned above in the present application.

Associative thickening polymer is intended to mean an amphiphilic polymer comprising hydrophilic groups and hydrophobic groups, said hydrophobic groups tending, in aqueous medium, to assemble together or with hydrophobic portions of other molecules, such as surfactants, to lead to thickening of the medium.

The hydrophilic groups and the hydrophobic groups may be positioned in the main chain of the associative thickening polymer or at the chain end. They may in particular be distributed blockwise in the main chain of said polymer.

The hydrophilic groups and the hydrophobic groups may also be pendent (or grafted) to the main chain of the associative thickening polymer, or be on groups which are pendent (or grafted) to the main chain of said polymer.

The hydrophilic groups of the associative thickening polymers may be chosen from urethane groups, carboxylic groups in acid form (COOH), ether groups (oxyalkylene) and carboxylic acid ester groups, and mixtures thereof. The hydrophilic groups of the associative thickening polymers are preferably chosen from urethane groups, (meth)acrylic acid groups, ethylene oxide and/or propylene oxide groups, (meth)acrylic acid ester groups, and mixtures thereof.

The hydrophobic groups of the associative thickening polymers may be chosen from $C_8$-$C_{30}$ hydrocarbon-based groups, and preferably $C_{10}$-$C_{22}$ hydrocarbon-based groups, as described above.

By way of example of thickener of use according to the invention, mention may be made, for example, of thickening polymers of polyacrylic or polyacrylate type, thickening polymers of polyurethane type, thickening polymers of cellulose type, such as methylcelluloses, thickening polymers of polysaccharide type, such as alginates, clays, and mixtures thereof.

The thickener is preferably chosen from associative thickening polymers and more preferentially from associative polyurethanes, associative acrylic polymers and mixtures thereof.

The associative polyurethanes and associative acrylic polymers of use according to the invention are known respectively under the names HEUR (Hydrophobically modified Ethylene oxide URethane) and HASE (Hydrophobic Alkali Soluble Emulsion).

These may be defined from the monomers which constitute them: the first is based on (meth)acrylic acid, the second is an ester of this acid, and the third is an associative hydrophobic monomer. By way of examples, mention may especially be made of the European patent applications EP 0 577 526 A1, EP 1 778 797 A1, EP 2 108007 A1, 15 EP 2 114378 A1, EP 2 303 982 A1, and the French patent applications FR 2 950 061 A1, FR 2 956 862 A1, FR 2 982 263 A1.

A non-ionic associative thickening polymer is preferably used.

More preferentially an associative thickening polyurethane is used which is obtained from at least one polyol and at least one polyisocyanate, and comprising at least one saturated or unsaturated, linear or branched, cyclic or acyclic hydrocarbon-based group comprising from 8 to 30 carbon atoms, said associative polyurethane also possibly comprising, or not comprising, one or more $C_1$-$C_4$ oxyalkylene groups.

The associative thickening polymers of use according to the invention are commercially available. Mention may be made, by way of example, of the thickener sold under the name "Coapur 3025" by Coatex, which corresponds to a non-ionic associative thickening polyurethane.

The total content of thickener(s) present in the adhesive composition according to the invention preferably ranges from 0.05 to 0.8% by dry weight of the weight of the adhesive composition.

J) PVC

The adhesive composition according to the invention preferably comprises at least polyvinyl chloride (PVC).

The latter is added in pulverulent form into the adhesive composition and makes it possible to improve the mechanical properties of the adhesive composition, especially in terms of hardness.

The total content of PVC present in the adhesive composition according to the invention preferably ranges from 0.1 to 10% by dry weight of the weight of the adhesive composition.

K) Aqueous Dispersion of Silica Nanoparticles

The adhesive composition according to the invention may also comprise at least one aqueous dispersion of silica nanoparticles.

The silica nanoparticles of use preferably have a particle size of less than 50 nm, more preferentially less than 20 nm.

The silica nanoparticles are preferably treated by means of an epoxysilane agent.

The content by dry weight of dispersion of silica nanoparticles present in the adhesive composition according to the invention preferably ranges from 0.5 to 5% by weight of the weight of the adhesive composition.

L) Additive

The adhesive composition according to the invention may also comprise one or more additives customarily used in adhesive composition, chosen for example from antioxidants, pigments, pot preservatives, antifoaming agents, antifungal agents, antibacterial agents, alkaline pH adjusters such as KOH, with a total content of additive(s) which may range from 0.1 to 2% by weight relative to the weight of the adhesive composition.

The adhesive composition according to the invention preferably comprises a pH greater than or equal to 8.5, and preferably ranging from 8.7 to 10.

The adhesive composition according to the invention is storage stable, that is to say that it does not become solid over time when it is stored in the form of a single-component composition.

When particular fillers as mentioned above are used, the adhesive composition according to the invention is particularly storage stable. Indeed, in this case, it is observed that the viscosity of the adhesive composition, measured after 28 days of storage at 23° C. after preparation of the adhesive composition, does not increase by more than 25% relative to its "initial" value measured 24 h after preparation of the adhesive composition.

The adhesive composition according to the invention is easy to use. In particular, it has a viscosity such that coating it is easy at low temperature (10 to 25° C.).

The adhesive composition according to the invention preferably has a viscosity ranging from 30 000 to 120 000 mPa·s, measured at 23° C., 24 hours after its preparation.

The adhesive composition according to the invention is easy to prepare. In particular, it does not become solid at the end of, or during, its preparation process.

The adhesive composition according to the invention is prepared by mixing the different ingredients. The fillers and the thickener will be introduced last.

The mixing time is preferably greater than or equal to 90 minutes.

The present invention also relates to the use of an adhesive composition according to the invention as described above as contact adhesive.

The adhesive composition according to the invention may be used to assemble a broad range of materials chosen, for example, from wood, which may be in the form of agglomerates, laminates, plywood, PVC, PS, rubber, metals, such as steel and aluminum, textiles, or resurfacing products such as cement-based products.

It may especially be used for adhesively bonding a first material to a second rigid material.

In particular, the adhesive composition according to the invention is particularly suited to the adhesive bonding of a floor covering to a resurfacing product.

The adhesive composition according to the invention is applied by double adhesive coating, at an amount of approximately 150 g/m$^2$, preferably at least 200 g/m$^2$, on each of the surfaces of the materials to be assembled. The application may be carried out by means of a notched spatula of standardized dimensions, making it possible to deposit the adhesive composition in a uniform layer while controlling the grammage applied. The grammage applied to each of the surfaces of the materials may reach 300 or even 350 g/m$^2$.

The composition is then left to dry for a time of less than 3 hours, until adhesive films which are dry to the touch are obtained. This may be verified in accordance with the method described below in the examples. As soon as there is no longer any transfer of adhesive onto fingers or paper, it is considered that the adhesive films are sufficiently dry to be able to be pressed against one another.

The materials are then assembled by pressing the adhesive films formed against one another.

The following examples are given purely by way of illustration of the invention and should not be interpreted as limiting the scope thereof.

EXAMPLES OF THE INVENTION

The compositions of examples 1 to 10 according to the invention are prepared from the different ingredients indicated in table 1, by mixing the ingredients one by one in a mixer and by adding the fillers and the thickener last.

The contents indicated in table 1 are expressed as % by weight of dry ingredients relative to the total weight of the composition.

Each composition is then subjected to the tests described below.

Neoprene aqueous-based contact adhesives sold under the name "Cege100 contact" by Cegecol (comprising approximately 5% by weight of filler) (C2) and "Uzin Wk 222" by Uzin (comprising approximately 22% by weight of filler) (C1) are tested under the same conditions as the adhesive compositions of examples 1 to 10 according to the invention.

1/ Evaluation of the Drying Time

For these tests, a laminated wood support, which is approximately 30 cm long, 30 cm wide and 1.5 mm thick, and a standard CTBS agglomerated wood support, which is approximately 30 cm long, 30 cm wide and 3 cm thick, were used.

The adhesive composition is applied to the wood surface (back) of the laminated support and the surface of the standard CTBS agglomerated wood support by means of a standardized notched spatula, making it possible to deposit approximately 200 g/m$^2$ of composition on each surface of the supports.

The supports coated with adhesive are left to dry in the open air at 20° C. in a humid environment at 65% relative humidity.

The drying time on the support is evaluated qualitatively by regularly exerting a small amount of pressure on the lines of adhesive by means of a finger or paper. The adhesive is estimated to be dry when there is no transfer of adhesive onto the finger or the paper.

The drying times observed on the agglomerated support are shorter than the drying times observed on the laminated support, due to the greater porosity of the agglomerated support.

Only the drying time results on the laminated support were therefore retained and recorded in table 2 below. The results are expressed in minutes.

2/ Evaluation of the Mechanical Properties by Shear Strength

Unless indicated otherwise in the present application, the preparation of the test specimens and the tensile shear strength tests were carried out in accordance with standard ISO 4587:2003, using a Zwick Z020 dynamometer (exerting a vertical pulling force at a constant rate of 500 meters per second).

For these tests, a beech test specimen, which is 10 cm long, 2.5 cm wide and 3 mm thick, and a laminated wood test specimen with the same dimensions (length, width and thickness), are used.

The adhesive composition is applied by double adhesive coating on the two test specimens by means of a standardized notched spatula, making it possible to deposit approximately 200 g/m$^2$ of composition on each surface of the test specimens. The adhesive composition is applied to one of the ends of each test specimen over an adhesive bonding zone 2.5 cm long and 2.5 cm wide.

Once they are coated with adhesive, the test specimens are left to dry in the open air at 20° C. in an environment having a level of humidity of between 55% and 65% relative humidity.

When the adhesive is dry, the two test specimens are assembled at the adhesively coated zone, then clamped by means of a clamping bench until the time t at which the test specimens are pulled.

The increase in cohesion of the adhesive composition is evaluated by measuring, at different times t (2 hours, 24 hours and 7 days, respectively, after adhesive coating), the strength of the adhesive joint subjected to a shearing stress.

The results are expressed as kilograms per centimeter squared and are recorded in table 2 below.

3/ Evaluation of the Heat Resistance

This test is carried out in order to evaluate the heat resistance of the adhesive bond when the adhesively bonded assembly is stressed in terms of temperature.

For these tests, a beech test specimen, which is 10 cm long, 2.5 cm wide and 3 mm thick, and a laminated wood test specimen with the same dimensions (length, width and thickness), are used.

The adhesive composition is applied to one of the ends of each test specimen over an adhesive bonding zone 2.5 cm long and 2.5 cm wide.

Once they are coated with adhesive, the test specimens are left to dry in the open air at 20° C. in an environment having a level of humidity of between 55% and 65% relative humidity.

The adhesive composition is applied by double adhesive coating on the two test specimens by means of a standardized notched spatula, making it possible to deposit approximately 200 g/m$^2$ of composition on each surface of the test specimens.

When the adhesive is dry, the two supports are assembled then clamped by means of a clamping bench. The assembly is left in the open air for 14 days at 20° C. in an environment having a level of humidity of between 55% and 65% relative humidity. The test specimens are then introduced into an oven, regulated at 23° C., and a 5 kg weight is attached to the end of one of the test specimens, perpendicular to the plane of the adhesive bond. A temperature gradient is applied in the oven, with a rise in temperature of 4.5° C. per minute, and the temperature at which the adhesively bonded assembly yields under the effect of the weight is observed.

The results are expressed as degrees Celsius and are recorded in table 2 below.

4/ Quality of the Initial Hold

For these tests, the same supports are used as for the test for evaluation of the drying time. The coating is carried out in the same way and under the same conditions as for the test for evaluation of the drying time. The test specimens are then superposed at their coated surface, leaving a 2 cm edge overhanging in order to facilitate gripping at the time of the detachment test.

Immediately after having joined the adhesively coated test specimens by manual pressing, the adhesively bonded assembly is placed on a table lengthwise and is subjected, at the adhesive joint, to a detachment force exerted by the same operator. In order to detach the two test specimens, the operator holds one of the test specimens with one hand, and pulls the end of the other test specimen with the other hand, while exerting a detachment force perpendicular to the plane of adhesive bonding of the assembly.

When the operator is able to detach the supports without force, it is estimated that the initial hold of the adhesive is weak (represented by minus, "−" in results table 2).

When the operator must provide force to detach the supports, it is estimated that the initial hold of the adhesive is strong (represented by minus, "+" in results table 2). When the force exerted by the operator is insufficient to detach the supports, it is estimated that the initial hold of the adhesive is excellent (represented by minus, "++" in results table 2).

5/ Evaluation of the Pot Stability

The adhesive composition is kept at 23° C. and 50% relative humidity. The viscosity is measured every 7 days. If, at the end of 28 days, the increase in viscosity measured at 28 days represents less than 25% of the value of the viscosity measured 24 hours after preparation of the adhesive, then it is considered that the formulation is stable and does not change over time.

The results are recorded in table 2 below.

TABLE 1

| | Ingredients | Contents as % by dry weight relative to the total weight of the composition Examples | | | | | | | | | |
|---|---|---|---|---|---|---|---|---|---|---|---|
| | | Ex 1 | Ex 2 | Ex 3 | Ex 4 | Ex 5 | Ex 6 | Ex 7 | Ex 8 | Ex 9 | Ex 10 |
| A1) | Dispercoll C84 | 13.2 | 12.65 | 12.65 | 11.55 | 10.45 | 9.9 | 10.18 | 9.82 | 9.35 | 9.35 |
| A2) | Dispercoll C VP LS 2372/1 | 8.7 | 8.12 | 8.12 | 6.96 | 6.5 | 6.2 | 6.2 | 6.2 | 5.98 | 5.98 |
| B) | Secoia Exp 503 | 4 | 4 | 4 | 4 | 4 | 4 | 4 | 3.5 | 3.5 | 3.5 |
| C) | $CaCO_3$ (>1 µm) (D50 = 8 µm) | 16 | 20 | — | — | — | — | — | — | — | — |
| | Silica (>1 µm) | — | — | 20 | 28.7 | 21 | 21 | 21 | 20 | 19 | 19 |
| | Neuburg silica (>1 µm) | — | — | — | — | 10 | 15 | 10 | 10 | 14 | 14 |
| | Sepiolite (>1 µm) | — | — | — | — | — | — | 1.5 | 1.5 | — | — |
| D) | Unsaturated cyclic fatty alcohol having a cloud point of 65° C. | 0.38 | 0.4 | 0.4 | 0.4 | 0.4 | 0.4 | 0.4 | 0.4 | 0.4 | 0.4 |
| | Unsaturated acyclic fatty alcohol, the HLB of which is equal to 16.5 | 1.8 | 1.8 | 1.7 | 1.7 | 1.7 | 1.7 | 1.7 | 1.7 | 1.7 | 1.7 |
| | Mixture of sodium monododecylphenoxybenzenedisulfonate salt and sodium didodecylphenoxybenzenedisulfonate salt | 0.25 | 0.25 | 0.25 | 0.25 | 0.3 | 0.3 | 0.3 | 0.3 | 0.3 | 0.3 |
| E) | ZnO | 0.23 | 0.23 | 0.23 | 0.23 | 0.23 | 0.23 | 0.23 | 0.23 | 0.23 | 0.23 |
| G) | Acronal ® S813 | 9.15 | 8 | 8 | 6 | 7.42 | 5.87 | 6 | 6 | 5.87 | — |
| | Plextol R 5530 | — | — | — | — | — | — | — | — | — | 5.4 |
| H) | Granolit 150N | 8 | 8 | 8 | 8 | 8 | 8 | 8 | 8 | 8 | 8 |
| I) | Non-ionic associative polyurethane thickener | 0.45 | 0.45 | 0.5 | 0.5 | 0.3 | 0.3 | 0.3 | 0.3 | 0.3 | 0.3 |
| J) | PVC powder | 6.42 | 6.7 | 6.7 | 6 | 4 | 4 | 4 | 4 | 4 | 4 |
| K) | Aqueous dispersion of silica nanoparticles | — | — | — | — | — | — | — | 1.85 | 1.85 | 1.85 |
| L) | Additives (biocide, antioxidant, antifoaming agent) | 0.72 | 0.72 | 0.72 | 0.72 | 0.72 | 0.72 | 0.72 | 0.72 | 0.72 | 0.72 |
| F) | Water | q.s. 100 | q.s. 100 | q.s. 100 | q.s. 100 | q.s. 100 | q.s. 100 | q.s. 100 | q.s. 100 | q.s. 100 | q.s. 100 | q.s.: sufficient amount to achieve a total composition weight of 100 g

TABLE 2

| Characterization | | Examples | | | | | | | | | | | |
|---|---|---|---|---|---|---|---|---|---|---|---|---|---|
| | | Ex 1 | Ex 2 | Ex 3 | Ex 4 | Ex 5 | Ex 6 | Ex 7 | Ex 8 | Ex 9 | Ex 10 | C1 | C2 |
| Drying time on laminate (min) | | 45 | 40 | 35 | 30 | 25 | 20 | 15 | 20 | 22 | 22 | 40 | 45 |
| Shear strength (kg/cm$^2$) | 2 h | 11 | 14 | 13 | 13 | 14 | 12 | 13 | 9 | 11 | 10 | 9 | 4 |
| | 24 h | 25 | 29 | 27 | 27 | 25 | 29 | 25 | 24 | 26 | 24 | 12 | 16.4 |
| | 7 d | 30 | 33 | 31 | 32 | 36 | 34 | 35 | 30 | 35 | 33 | 18 | 16.6 |
| Heat resistance (° C.) | | 125 | 125 | 115 | 120 | 120 | 120 | 140 | 140 | 135 | 130 | 115 | 110 |
| Initial hold | | + | + | ++ | + | ++ | ++ | ++ | ++ | + | + | + | + |
| Pot stability | | yes | yes | yes | yes | yes | yes | yes | yes | yes | yes | yes | yes |

The invention claimed is:

1. An adhesive composition comprising:
   A) from 5 to 40% by dry weight, relative to total dry weight of the adhesive composition, of a mixture of polychloroprenes comprising:
      A1) at least one polychloroprene having a hardness greater than or equal to 80 Shore A; and
      A2) at least one polychloroprene having a hardness less than or equal to 60 Shore A;
   B) from 0.5 to 25% by dry weight, relative to total dry weight of the adhesive composition, of at least one self-crosslinkable agent of alkyd type, wherein the at least one self-crosslinkable agent of alkyd type comprises:
      (i) at least one alkyd resin comprising at least one 5-membered cyclocarbonate function (Y), and
      (ii) at least one alkyd resin comprising at least one primary amine function (X) salified by an acid having a pKa ranging from 1 to 14, and having a carbon-based chain comprising from 1 to 6 carbon atoms;
   C) from 10 to 40% by dry weight, relative to total dry weight of the adhesive composition, of at least one mineral filler;
   D) from 0.05 to 3% by dry weight, relative to total dry weight of the adhesive composition, of at least one emulsifier; and
   E) water in which said mixture of polychloroprenes is dispersed.

2. The adhesive composition of claim 1, wherein the mixture of polychloroprenes comprises:
   A1) at least one polychloroprene in aqueous dispersion having a hardness greater than or equal to 85 Shore A, and/or
   A2) at least one polychloroprene in aqueous dispersion having a hardness less than or equal to 55 Shore A.

3. The adhesive composition of claim 1, wherein the at least one mineral filler is selected from the group consisting of calcium carbonate, silica, a composite based on silica and kaolinite, sepiolite, and a mixture thereof.

4. The adhesive composition of claim 1, wherein the at least one emulsifier comprises a system of at least two emulsifiers selected from the group consisting of the following emulsifiers:

oxyethylenated unsaturated acyclic fatty alcohols having an HLB ranging from 15 to 18;
oxyethylenated unsaturated cyclic fatty alcohols having a cloud point ranging from 63 to 67° C.;
mixtures of mono- and dialkylphenoxybenzenedisulfonate salts comprising a linear or branched alkyl portion having from 10 to 14 carbon atoms;
oxyethylenated sulfosuccinic acid and alcohol hemiester salts comprising from 10 to 14 carbon atoms;
oxyethylenated alkyl ether sulfate salts comprising a linear or branched alkyl portion having from 12 to 14 carbon atoms; and
polyvinyl alcohols.

5. The adhesive composition of claim 1, further comprising:
at least one metal oxide;
at least one adhesion agent selected from the group consisting of copolymers of styrene and (meth)acrylic acid, copolymers of styrene and (meth)acrylic acid ester, copolymers of styrene and (meth)acrylamide, homopolymers and copolymers of butadiene, vinyl acetate polymers, polyurethanes obtained from at least one polyol and at least one polyisocyanate, and mixtures comprising at least one polyurethane obtained from at least one polyol and at least one polyisocyanate and at least one polyester obtained by polycondensation between at least one polyol and at least one polyacid;
at least one tackifying resin;
at least one thickener;
at least one polyvinyl chloride; and/or
at least one aqueous dispersion of silica nanoparticles.

6. The adhesive composition of claim 5, wherein the at least one metal oxide is ZnO.

7. The adhesive composition of claim 1, wherein the adhesive composition has a viscosity ranging from 30,000 to 120,000 mPas, measured at 23° C.

8. A multilayer structure comprising at least two identical or different layers of material bonded to one another by a layer of the adhesive composition of claim 1.

9. An adhesive composition comprising:
A) from 5 to 40% by dry weight, relative to total dry weight of the adhesive composition, of a mixture of polychloroprenes comprising:
A1) at least one polychloroprene having a hardness greater than or equal to 80 Shore A; and
A2) at least one polychloroprene having a hardness less than or equal to 60 Shore A;
B) from 0.5 to 25% by dry weight, relative to total dry weight of the adhesive composition, of at least one self-crosslinkable agent of alkyd type;
C) from 10 to 40% by dry weight, relative to total dry weight of the adhesive composition, of at least one mineral filler;
D) from 0.05 to 3% by dry weight, relative to total dry weight of the adhesive composition, of at least one emulsifier; wherein the at least one emulsifier comprises a system of at least two emulsifiers selected from the group consisting of the following emulsifiers:
oxyethylenated unsaturated acyclic fatty alcohols having an HLB ranging from 15 to 18;
oxyethylenated unsaturated cyclic fatty alcohols having a cloud point ranging from 63 to 67° C.;
mixtures of mono- and dialkylphenoxybenzenedisulfonate salts comprising a linear or branched alkyl portion having from 10 to 14 carbon atoms;
oxyethylenated sulfosuccinic acid and alcohol hemiester salts comprising from 10 to 14 carbon atoms;
oxyethylenated alkyl ether sulfate salts comprising a linear or branched alkyl portion having from 12 to 14 carbon atoms; and
polyvinyl alcohols; and
has been substituted with E) water in which said mixture of polychloroprenes is dispersed.

10. The adhesive composition of claim 9, wherein the mixture of polychloroprenes comprise:
A1) at least one polychloroprene in aqueous dispersion having a hardness greater than or equal to 85 Shore A, and/or
A2) at least one polychloroprene in aqueous dispersion having a hardness less than or equal to 55 Shore A.

11. The adhesive composition of claim 9, wherein the at least one mineral filler is selected from the group consisting of calcium carbonate, silica, a composite based on silica and kaolinite, sepiolite, and a mixture thereof.

12. The adhesive composition of claim 9, further comprising:
at least one metal oxide;
at least one adhesion agent selected from the group consisting of copolymers of styrene and (meth)acrylic acid, copolymers of styrene and (meth)acrylic acid ester, copolymers of styrene and (meth)acrylamide, homopolymers and copolymers of butadiene, vinyl acetate polymers, polyurethanes obtained from at least one polyol and at least one polyisocyanate, and mixtures comprising at least one polyurethane obtained from at least one polyol and at least one polyisocyanate and at least one polyester obtained by polycondensation between at least one polyol and at least one polyacid;
at least one tackifying resin;
at least one thickener;
at least one polyvinyl chloride; and/or
at least one aqueous dispersion of silica nanoparticles.

13. The adhesive composition of claim 12, wherein the at least one metal oxide is ZnO.

14. The adhesive composition of claim 9, wherein the adhesive composition has a viscosity ranging from 30,000 to 120,000 mPas, measured at 23° C.

15. A multilayer structure comprising at least two identical or different layers of material bonded to one another by a layer of the adhesive composition of claim 9.

* * * * *